United States Patent [19]

Villelli

[11] 4,095,744
[45] Jun. 20, 1978

[54] APPARATUS AND METHOD FOR SUPPORTING AND PROTECTING SPRINKLE SYSTEM RISERS AND PIPES

[76] Inventor: Anthony T. Villelli, 1451 N. Citrus Dr., La Habra, Calif. 90631

[21] Appl. No.: 774,949

[22] Filed: Mar. 7, 1977

[51] Int. Cl.² .......................................... A01G 25/00
[52] U.S. Cl. .................................... 239/1; 239/201; 239/276; 248/71
[58] Field of Search ................ 239/201, 203–206, 239/276, 1; 248/71, 85, 87, 505; 52/155

[56] References Cited

U.S. PATENT DOCUMENTS

| 271,562 | 1/1883 | Worthley | 248/85 |
|---|---|---|---|
| 1,763,119 | 6/1930 | Archer | 239/276 X |
| 2,421,103 | 5/1947 | Wadsworth | 239/276 |
| 3,105,510 | 10/1963 | Demosthenes | 248/87 X |
| 3,193,205 | 7/1965 | Hanson | 239/276 |
| 3,542,294 | 11/1970 | Tucker | 239/276 X |

*Primary Examiner*—Robert W. Saifer
*Attorney, Agent, or Firm*—Richard L. Gausewitz

[57] ABSTRACT

To protect sprinkler system risers and supply pipes from accidental or vandalistic damage, in an extremely simple and economical manner, a fork-shaped element is pounded down in straddling relationship around each riser and the associated pipe joint. The legs of the fork are thus on opposite sides of the riser and joint, whereas the hollow body of the fork element encompasses and restrains the riser. The fork element may be economically manufactured from a single sheet of metal, with a tubular body and diametrically-opposed parallel legs adapted to straddle the joint in the horizontal supply pipe.

17 Claims, 6 Drawing Figures

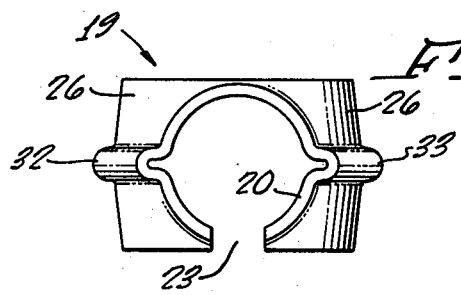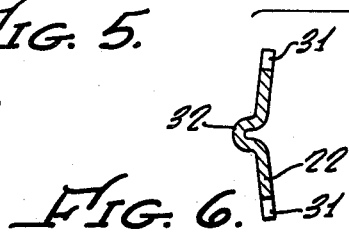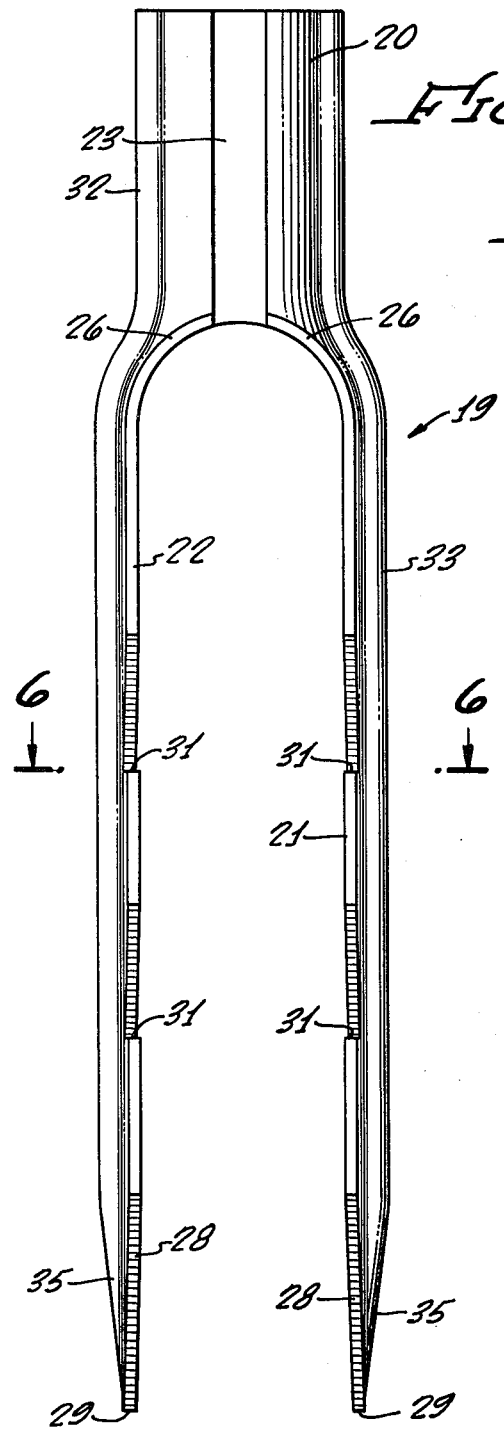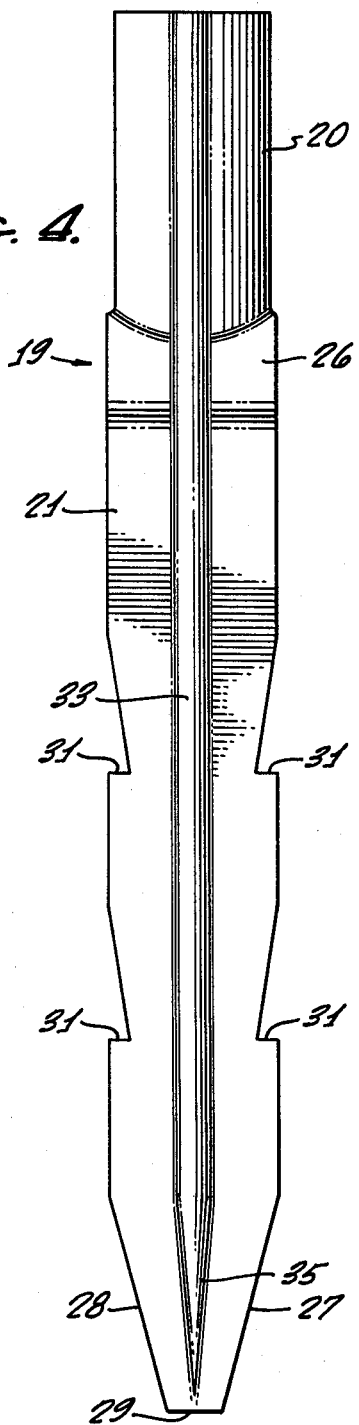

APPARATUS AND METHOD FOR SUPPORTING AND PROTECTING SPRINKLE SYSTEM RISERS AND PIPES

BACKGROUND OF THE INVENTION

1. Field of the Invention

This invention relates to the field of underground sprinkling systems, and apparatus and methods for stabilizing, protecting and strengthening them.

2. Description of Prior Art

There has long existed a severe problem relative to the stabilizing, supporting and protecting of riser pipes which project vertically to the sprinkler heads from joints in horizontal underground supply pipes. When such a riser is unsupported, it is often kicked over either accidentally or intentionally by vandals, or is otherwise damaged as by lawn equipment.

It is important to understand that if such damage is only to the riser itself, the resulting repair job is very easy and inexpensive. All that need be done is unscrew the riser and replace it with a new one, following which the sprinkler head is connected. To prevent dirt from entering the supply pipes during such repair, it is merely necessary to run the water slowly during connection of the new riser.

If, on the other hand, the supply-pipe joint itself—or a supply pipe—is broken, then the repair job is a major one. There is then much digging required, and much time and effort, as well as additional parts for repair of the underground system.

Thus, there is a distinct need for a practical and economical apparatus and method for supporting the riser and—above all—making substantially sure that there can be no damage to a supply pipe or joint.

This need is not, however, adequately satisfied by apparatus which cannot practically or easily be installed after the sprinkler system has been fully constructed and embedded and is in actual use (whether for a long or short time). There exist vast numbers of existing sprinkler risers which are unsupported, and it is impractical and unsatisfactory to dig a hole around each one in order that support and protection may be achieved.

Instead, there is required an apparatus and method which may be installed on any desired existing riser in a matter of minutes, with no digging whatsoever, which will protect such riser against all but the worst blows and shocks, and which will in almost all cases insure that the supply pipe and joint will be undamaged so that any repair procedure is minimal.

It is also important that the apparatus be inexpensive. Furthermore, for some uses as in the case where vibratory-type sprinkling devices are to be used, it is important that there be sufficient rigidity to withstand the hydraulically-created forces. In this regard, and others, flexible risers (known in the art) are highly deficient.

SUMMARY OF THE INVENTION

In accordance with one aspect of the present method, a supporting and stabilizing means is pounded down into the earth in supporting relationship to a riser that has previously been installed and embedded in the earth. During such pounding, the riser itself is used to properly direct and guide the supporting and stabilizing means—in a manner making sure that the supply pipe or joint will not be damaged. The lower portion of the supporting means is caused to extend downwardly to a depth substantially below that of the supply pipe.

In accordance with another aspect of the present method, there are provided two parallel fork legs connected at one end by a generally tubular body. The body is sized to fit around the riser, and the fork legs are so spaced as to straddle the joint in the supply pipe. The apparatus is driven downwardly, in such rotational position that the legs will not damage the joint, until the body is at a desired depth. During such driving, both the body and the legs are directed and guided by buried components of the sprinkler system.

The stabilizing, protecting and supporting apparatus comprises two parallel legs spaced to straddle the joint, and a body connecting the upper leg ends and which fits around the riser. The legs lie in substantially parallel planes, and are sufficiently broad that if they are not penetrating parallel to the riser they will be deflected thereby, and thus will not damage the upper region of the pipe joint.

When the apparatus is made of metal, it is a single sheet of metal so bent that the body curves around the riser and the legs straddle the joint.

BRIEF DESCRIPTION OF THE DRAWINGS

FIG. 3 is a front elevational view of the apparatus;

FIG. 4 is a side elevational view thereof;

FIG. 5 is a top plan view; and

FIG. 6 is a horizontal section on line 6—6 of FIG. 3.

DETAILED DESCRIPTION OF THE PREFERRED EMBODIMENT

The apparatus will be described herein as formed of relatively heavy-gauge sheet metal, preferably galvanized sheet steel. For example, the sheet metal may be 3/32 inch thick. For high production, however, the apparatus may also be formed of a suitable synthetic resin.

Figure 1:
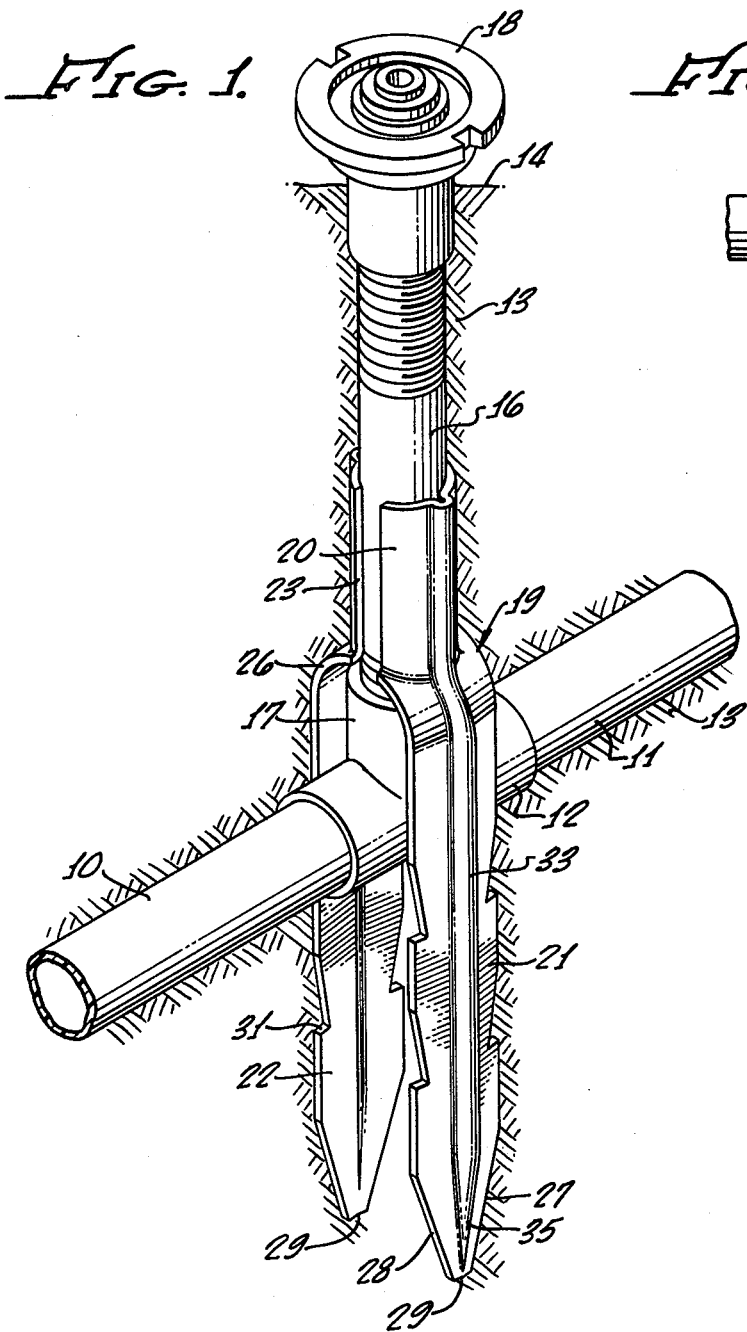
FIG. 1 is an isometric view showing the present stabilizing, protecting and supporting apparatus as embedded in the earth.

Referring to the drawings, and especially to FIG. 1, two axially-aligned horizontal pipes 10 and 11 are connected to each other by a tee 12 and are buried in the ground 13 at a suitable depth below the surface 14. Elements 10–12 are conventionally formed of plastic, such as polyvinyl chloride. The earth or ground 13 is often settled around the buried elements 10–12 (and also 16), in which case there are ground-cover plants (such as grass, not shown) at surface 14.

A riser 16 extends upwardly from the upwardly-protuberant central portion 17 of tee or joint 12 to the vicinity of surface 14, having a sprinkler head 18 screwed onto its upper threaded end. The lower end of the riser is threaded into central portion 17. Riser 16 is also conventionally formed of synthetic resin, such as polyvinyl chloride, but it may also be formed of metal such as galvanized steel.

Proceeding next to a description of the apparatus 19 for stabilizing riser 16, and for preventing damage to the riser or to the joint 12 or either of pipes 10 and 11, this comprises a body 20 and parallel legs 21 and 22. Thus, the apparatus 19 is generally fork-shaped. The body 20 is adapted to fit around riser 16, whereas the legs 21-22 are adapted first to extend downwardly on opposite sides of the riser and then to extend around the tee or joint 12 in straddling relationship as illustrated.

Body 20 is a vertical tube the inner diameter of which is only slightly greater than that of the tubular riser 16, both the body 20 and the riser 16 being cylindrical in the present embodiment. Since the apparatus 19 is stamped out of sheet metal and then rolled so as to form the tubular body 20, and so as to cause the legs 21-22 to be parallel with each other as described below, there is a gap 23 provided longitudinally of the body. It is possible to join the vertical edges at gap 23, but this is not necessary and merely increases cost.

The body 20 is shown as being relatively short, for example about two inches in length, but it is to be understood that much longer lengths may be employed if desired. It is pointed out that different sizes of apparatus 19 are preferably employed relative to different diameters of plastic elements.

The legs 21-22 extend downwardly from opposite sides of body 20, on opposite sides of gap 23, and lie in parallel vertical planes (on opposite sides of the axis of elements 10-12) which are spaced from each other preferably only slightly farther than the horizontal transverse dimension of the joint 12. Also, the legs 21-22 are preferably directly opposite each other, that is to say the forward edges of the legs (for example, those edges closest to gap 23) lie in a single plane perpendicular to the common axis of elements 10-12, whereas the remaining edges of the legs lie in a second plane perpendicular to the common axis of such elements.

The legs 21-22 are sufficiently wide that substantially all portions of the riser 16 are disposed therebetween.

Figure 2:
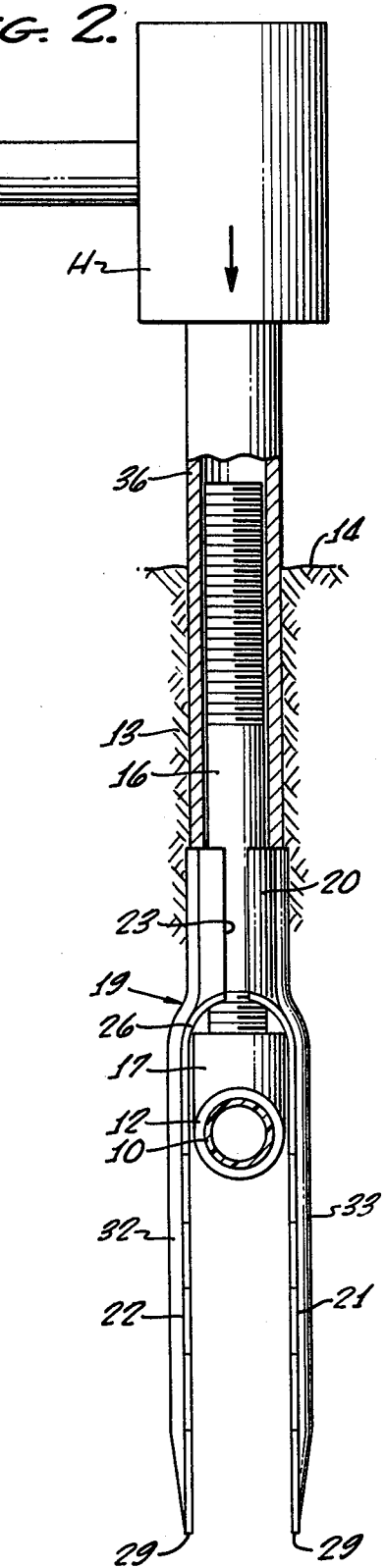
FIG. 2 is a view illustrating the final portion of the driving of the apparatus into the earth for protection of a previously-buried sprinkler system.

At their upper ends, legs 21-22 converge upwardly as best shown in FIGS. 2 and 3, at convergent regions 26, due to the fact that the outer diameter of the tee 12 is normally greater than that of riser 16. At their lower ends, the edges of the legs are downwardly convergent as shown at 27-28 in FIGS. 1 and 4, to facilitate driving into the ground. The lower ends of the legs are not sharply pointed, preferably, being instead blunt as shown at 29. As an example, given by way of illustration only, each blunt end may be approximately ⅛ inch in horizontal dimension.

The edges of the legs are notched as shown at 31, at spaced points therealong, to increase resistance to withdrawal from the ground or earth.

Diametrically-opposite beads 32-33 are provided both on body 20 and on legs 21-22 to increase the rigidity of such elements. The lower ends of the bead portions on legs 21-22 are tapered, as shown at 35 in FIGS. 3 and 4, for minimized resistance to driving into the earth.

DESCRIPTION OF THE METHOD

The gauge of the metal employed to form the apparatus 19 is sufficiently heavy that the body 20 and legs 21-22 will be substantially rigid. On the other hand, it is emphasized that the sheet metal is sufficiently thin that driving into the earth will be facilitated.

First, the method will be described relative to the stabilizing, supporting and protecting of a riser in a long-existing lawn sprinkler system. For example, let it be assumed that the home owner has noticed that the particular riser is in a spot where it is being frequently abused by children, lawnmowers, or whatever, and he fears that it will break. Then, all he needs to do is purchase one of the present units 19, unscrew the sprinkler head 18, and cause the leg ends 29 to engage the earth on both sides of the upper end of the riser. In the majority of situations, the home owner knows which direction the pipes 10, 11 run. He therefore causes the leg ends 29 to be equally spaced on opposite sides of the vertical plane containing the axis of such elements 10, 11.

The home owner then pounds on the upper end of body 20 with a hammer or mallet H (FIG. 2), causing the legs 21-22 to penetrate into the earth on opposite sides of riser 16. He attempts to cause the legs to penetrate vertically, but it is emphasized that in the event of undesired deflection of the legs one of them will engage (at its blunt end 29) the side of riser 16 and thus be directed back into the proper downward course.

When the blunt ends 29 reach the tee 12 they straddle the same, and in most instances (with conventional riser lengths) this occurs at about the time the body 20 is at least partially surrounding the upper riser end. At this time, the home owner takes a drive sleeve 36 and engages it axially with the upper end of the body 20. The mallet H (FIG. 2) is then used relative to the drive sleeve in order to force the body (and thus the legs) further down into the earth until, finally, the position shown in FIGS. 1 and 2 is achieved. During this portion of the installation method, body 20 and riser 16 cooperate with each other in effecting correct downward direction of the apparatus 19.

The drive sleeve 36 may have a wall thickness not much greater than that of the body, so that it merely follows the body in the annulus created thereby. It is to be noted that the legs, as they penetrate the earth, create a loosening action which facilitates penetration of the body.

The drive sleeve 36 is then removed, the sprinkler head is screwed back in position, and the entire operation is thus complete. The earth around riser 16 settles back into place in a relatively short time (even in the absence of tamping), and everything is as before except that the riser 16 is protected and stabilized.

It is emphasized that body 20, which closely surrounds the lower portion of riser 16, and which is itself firmly supported by the legs 21-22 which penetrate deep into the solid earth beneath the pipes, protect the riser against any reasonable amount of abuse. However, in the event that some vandal kicks the sprinkler head with great force, and the riser 16 is formed of plastic, there could occur a breakage of the riser. Such breakage will, however, occur adjacent the upper end of body 20. Thus, to repair the unit it is merely necessary to dig a very small hole, unscrew the broken-off lower end of the riser, replace the riser and head and refill the hole.

Even in the case of extreme vandalism, therefore, the pipes 10, 11 and the tee 12 are protected. As stated earlier in this application, it is damage to these elements 10-12 which creates severe repair problems.

The present apparatus may be made sufficiently strong and large as to completely protect the riser 16 against all but the most severe vandalism, for example by hammer blows. This may be done by causing the body 20 to extend almost all of the way to the sprinkler head. Also, and alternatively, the body 20 may be relatively short and the legs 21, 22 may be made much longer than those illustrated. The legs will then penetrate the same distance into the ground as illustrated, but the body will be near the surface.

There will next be described the performance of the method relative to a new sprinkler system. The system is first laid out in trenches, and the water is turned on (prior to filling of the trenches) in order to make sure that everything is proper. Then, everything being correct, the sprinkler heads are screwed off at those risers which are particularly vulnerable to accidental or vandalistic damage. The present apparatus 19 is driven into place, this being an extremely easy job since there is then no earth above the elements 10-12. During such driving, by sleeve 36, each riser serves as a track for apparatus 19. After the apparatus 19 is in the illustrated position, or in some desired higher position, earth is placed in the trenches to complete the job.

The foregoing detailed description is to be clearly understood as given by way of illustration and example only, the spirit and scope of this invention being limited solely by the appended claims.

I claim:

1. A method of stabilizing and supporting a portion of an underground lawn-sprinkling system, said portion comprising a riser pipe extending upwardly to a sprinkler head from a joint to an underground supply pipe, said method comprising:
    (a) driving elongated vertical support means into the ground at said riser pipe in an underground lawn-sprinkling system, and
    (b) employing said riser to direct the downward course of said support means as it is thus driven, whereby said support means is in stabilizing and supporting relationship to said riser after completion of said driving.

2. The invention as claimed in claim 1, in which said method is performed relative to an existing lawn-sprinkling system portion which has been embedded in the ground for a long period of time, whereby the earth has settled and compacted therearound and lawn plants are growing thereover.

3. The invention as claimed in claim 1, in which said directing step (b) is so performed that, at substantially all times during said driving, the lower end of said support means is prevented by said riser from moving a substantial distance laterally of said riser in at least two directions.

4. The invention as claimed in claim 1, in which said directing step (b) includes, at least at its later stages, causing a tubular element associated with said support means to be mounted around said riser, said tubular element also being employed in the performance of said step (c).

5. The invention as claimed in claim 4, in which said driving step is effected by mounting a sleeve coaxially around said tubular element above the same, and driving on said sleeve.

6. The invention as claimed in claim 1, in which said method further comprises employing two parallel and connected legs as said support means, and so locating said legs that they are on opposite sides of said riser and are in straddling relationship to the underlying supply pipe joint.

7. The invention as claimed in claim 6, in which said method further comprises employing legs which are connected at their upper ends by an element which will fit around said riser, and causing said element to be mounted around said riser and embedded in the earth during at least the last stages of said driving step.

8. A stabilized and supported portion of an underground sprinkling system, comprising the combination of:
    (a) a buried riser pipe extending vertically upwardly to the surface of the earth from a buried horizontal supply pipe which communicates with said riser,
    (b) supporting, stabilizing and protecting means comprising two legs straddling said supply pipe and penetrating downwardly into the earth a substantial distance below said supply pipe,
    (c) means connecting said legs to said riser in stabilizing and supporting relationship relative thereto, and
    (d) a sprinkler head mounted at the upper end of said riser above said means (c).

9. The invention as claimed in claim 8, in which said means (c) comprises a body mounted around said riser and connected to both of said legs.

10. The invention as claimed in claim 9, in which said legs and body are formed integrally from a single sheet of sheet metal, there being no joints therebetween.

11. The invention as claimed in claim 9, in which said sprinkler head is mounted substantially at the elevation of the surface of the ground.

12. A device for stabilizing, supporting and protecting sprinkler system risers which are connected to underground supply pipes, said device comprising:
    (a) a substantially rigid, unjointed body which is adapted to mount around a sprinkler system riser, and
    (b) two fork legs rigidly connected to said body and extending downwardly therefrom,
        said legs being parallel to each other and being spaced from each other a distance sufficient to permit said legs to straddle the underground supply pipe joint to which said riser is connected.

13. The invention as claimed in claim 12, in which said body is a substantial tube which is sized to fit relatively closely around said riser, said body being connected rigidly to said legs.

14. The invention as claimed in claim 13, in which said legs are spaced from each other a distance barely sufficient to permit said straddling of said supply pipe joint.

15. The invention as claimed in claim 13, in which said legs lie in parallel planes and are directly opposite each other, and in which said legs are sufficiently wide that all portions of said riser are disposed therebetween.

16. The invention as claimed in claim 15, in which the lower ends of each of said legs is downwardly convergent but not sharp pointed, and in which the upper ends of said legs converge upwardly prior to joining said tube.

17. A device formed of a single sheet of sheet metal for stabilizing, supporting and protecting sprinkler system risers, said device comprising:
    (a) a body which is adapted to mount around a sprinkler system riser, said body being tubular and having a longitudinal gap therein, and
    (b) two parallel fork legs connected to said body and extending downwardly therefrom, said legs being wide and flat, said legs being integral with said body and lying in parallel planes on opposite sides of said body, said legs being spaced from each other a distance sufficient to permit said legs to straddle the underground supply pipe joint to which said riser is connected.

* * * * *

UNITED STATES PATENT AND TRADEMARK OFFICE
CERTIFICATE OF CORRECTION

PATENT NO. : 4,095,744
DATED : June 20, 1978
INVENTOR(S) : Anthony T. Villelli

It is certified that error appears in the above-identified patent and that said Letters Patent are hereby corrected as shown below:

Title page of the patent, in the title [54], cancel "SPRINKLE" and substitute --- SPRINKLER ---.

Column 1, in the title, cancel "SPRINKLE" and substitute --- SPRINKLER ---.

Column 3, line 40, cancel "7/8" and substitute --- 3/8 ---.

*Signed and Sealed this*

*Twenty-second* Day of *May 1979*

[SEAL]

Attest:

RUTH C. MASON
*Attesting Officer*

DONALD W. BANNER
*Commissioner of Patents and Trademarks*